Figure 1:
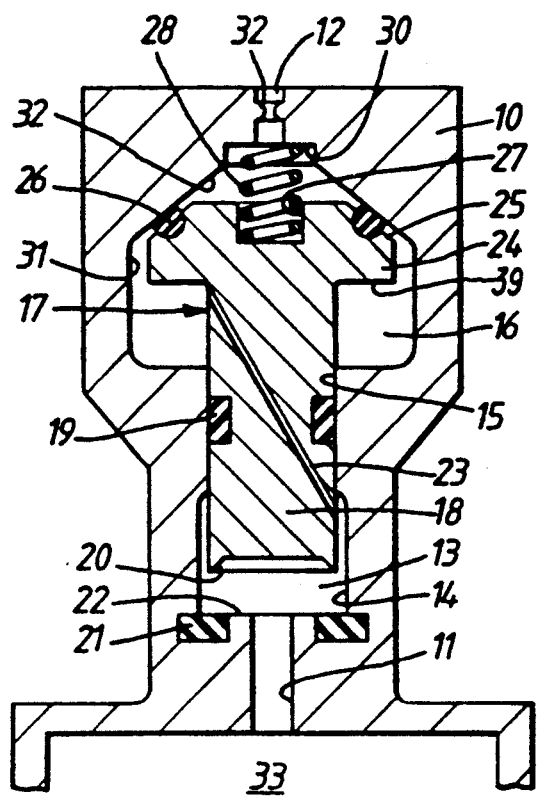

United States Patent [19]
Cassidy

[11] Patent Number: 5,211,200
[45] Date of Patent: May 18, 1993

[54] AUTOMATIC BLEED VALVES

[75] Inventor: Ronald F. Cassidy, Hampshire, England

[73] Assignee: Pall Corporation, Glen Cove, N.Y.

[21] Appl. No.: 887,836

[22] Filed: May 26, 1992

[30] Foreign Application Priority Data

May 24, 1991 [GB] United Kingdom ............... 9111327

[51] Int. Cl.⁵ ............................................. F16K 24/00
[52] U.S. Cl. ...................................... 137/199; 137/183
[58] Field of Search ............... 137/197, 199, 177, 183

[56] References Cited

U.S. PATENT DOCUMENTS

| | | | |
|---|---|---|---|
| 2,362,724 | 11/1944 | Shea | 137/197 X |
| 2,729,228 | 1/1956 | Stevenson | 137/199 |
| 2,908,282 | 10/1959 | Maisch | 137/199 |
| 3,031,845 | 5/1962 | Ludwig | 137/199 X |
| 4,524,793 | 6/1985 | Silverwater | 137/199 X |
| 4,813,446 | 3/1989 | Silverwater et al. | |

FOREIGN PATENT DOCUMENTS

| | | |
|---|---|---|
| 951761 | 7/1959 | United Kingdom . |
| 1599861 | 5/1978 | United Kingdom . |
| 2158561 | 10/1984 | United Kingdom . |

Primary Examiner—Alan Cohan
Attorney, Agent, or Firm—Leydig, Voit & Mayer

[57] ABSTRACT

An automatic bleed valve bleeds gas from a liquid reservoir. It comprises a housing having a passage extending between an inlet and an outlet with the passage including a bore in which a piston is slidably received. The piston includes a capillary providing fluid communication between the inlet and a chamber formed in the passage adjacent the outlet. The piston is biased into an upstream position in which gas entering the inlet passes through the capillary to the chamber and thence to the outlet. However, the passage of liquid through the capillary so increases the pressure drop across the piston as to move the piston to a downstream position in which the piston closes the outlet to prevent communication between the chamber and the outlet, thus closing the valve. A downstream end of the piston is located in the chamber and has a greater area than the upstream end of the piston so that when the piston is in the downstream position the pressure of liquid in the chamber acting on the greater area maintains the valve closed, thus allowing the valve to accommodate pressure fluctuations in the reservoir. By a suitable reversal of parts, the valve can be used to bleed liquid from a pressurized gas reservoir.

10 Claims, 2 Drawing Sheets

AUTOMATIC BLEED VALVES

BACKGROUND TO THE INVENTION

1. Field of the Invention

The invention relates to automatic bleed valves for bleeding a gas from a pressurized liquid reservoir or for bleeding a liquid from a pressurized gas reservoir.

2. Brief Review of the Prior Art

One type of valve used for this purpose is shown in GB-A-2188561 and GB-A-2203520. In such valves, when bleeding a gas from a liquid, a housing is provided having a passage extending between a housing inlet and a housing outlet. The passage includes a bore in which a piston is slidably received with the piston including a capillary providing fluid communication between the inlet and the outlet. The piston is biased into an upstream position in which gas entering the inlet passes through the capillary to the outlet. If, however, liquid passes through the capillary, the pressure drop across the piston is increased and the piston moves to a downstream position in which the piston closes the outlet to prevent communication between the inlet and the outlet.

In general, such valves have been found to work satisfactorily. In certain systems, however, the reservoir, once bled and pressurized, can become partly depressurized due, for example, to high system flow rates. This resultant loss of pressure can result in the piston moving from the downstream position back into the upstream position with consequent loss of liquid and depressurization. Although such depressurization is normally of a transient nature, it could occur repeatedly before the system is shut down.

SUMMARY OF THE INVENTION

According to the invention, there is provided an automatic bleed valve for bleeding to a vent one fluid component from a reservoir containing a liquid component and a gas component, comprising a housing having an inlet connecting to the reservoir and an outlet connecting to the vent, a chamber communicating with said inlet, a chamber communicating with said outlet, a bore connecting said chamber, a piston received in said bore, sliding between upstream and downstream positions and having one end in said inlet chamber and one end in said outlet chamber, biasing means biasing the piston towards the upstream position, means within said piston communicating the inlet chamber with the outlet chamber to pass the bled component to the outlet without overcoming the force of the biasing means and producing a force on the piston moving the piston to the downstream position when the other component passes therethrough preventing communication between the piston means and the outlet, a piston surface on said piston and in a chamber and acted on by the other component when the piston is in the downstream position to produce a force urging the piston into the downstream position.

Thus, the greater area of the piston provides an increased force holding the piston in the position in which the outlet is closed. On reduction of the pressure of the other fluid, the valve will thus have a reduced tendency to open and depressurize the reservoir.

Figure 2:
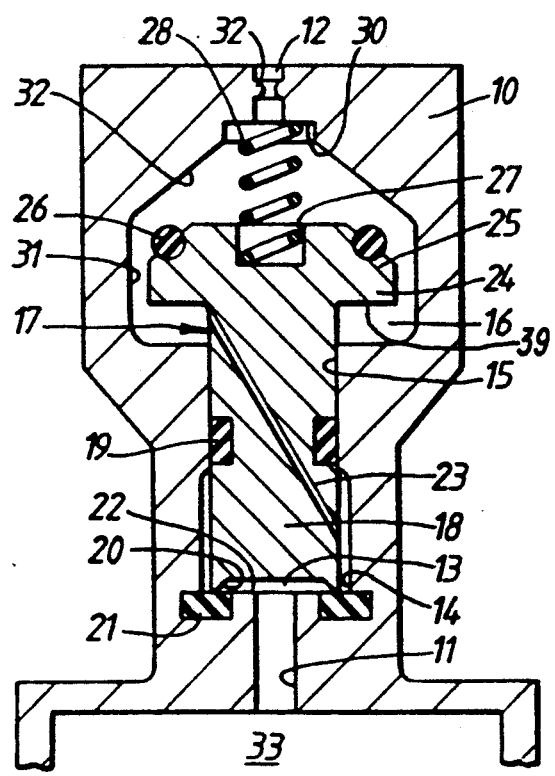
Figure 3:
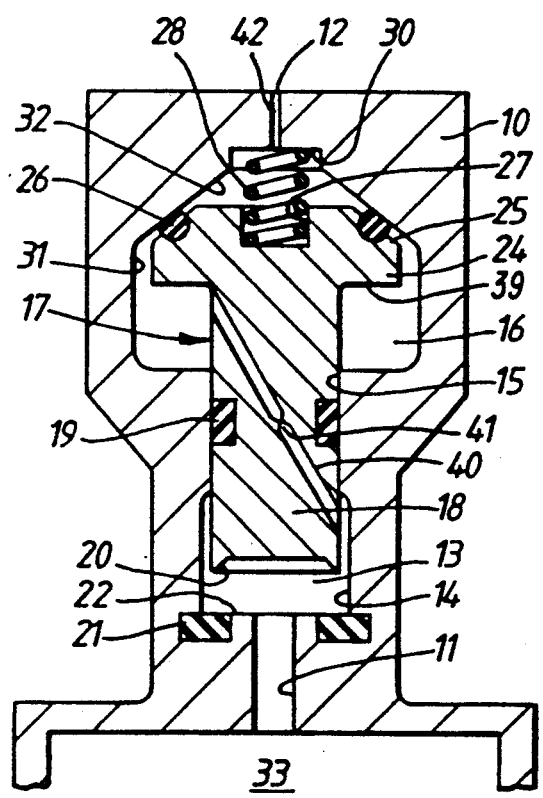

The following is a more detailed description of an embodiment of the invention, by way of example, reference being made to the accompanying drawings in which:

FIG. 1 is a schematic cross section of an automatic bleed valve for bleeding a gas from a liquid and showing a piston of the valve in a position in which the valve is closed, FIG. 2 is a similar view to FIG. 1, but showing the valve in an open unpressurized position, and FIG. 3 is a similar view to FIG. 1 but showing an automatic bleed valve for bleeding a liquid from a gas and showing a piston of the valve in a position in which the valve is closed.

Referring to FIGS. 1 and 2, the bleed valve for bleeding a gas from a liquid comprises a housing 10 having an inlet 11 and an outlet 12. A passage 13 extends between the inlet 11 and the outlet 12 and is formed with an inlet chamber 14, a bore 15 and an outlet chamber 16.

A piston 17 within the housing is of generally cylindrical shape and has a piston body 18 which is carried for sliding movement in the bore 15. A seal 19 extends around the outer surface of the piston body 18 to prevent the passage of fluid between the piston body 18 and the bore 15.

The upstream end of the piston 17 (i.e. the portion of the piston 17 closest to the inlet 11) extends into the inlet chamber 14. This part of the piston 17 includes an axially extending peripheral projection 20 aligned with an annular seal 21 provided around a step 22 between the inlet chamber 14 and the inlet 11.

A capillary 23 extends between a point on the outer surface of the piston 17 within the inlet chamber 14 adjacent the upstream end of the piston to a point on the outer surface of the piston which is in the outlet chamber 16.

The downstream end of the piston 17 (i.e. the portion of the piston adjacent the outlet 12) is provided with a generally annular head 24 having a greater diameter than the diameter of the piston body 18 and connected to the piston body 18 by an annular radially extending surface 39. The free end of the head 25 is provided with a frusto-conical outer surface 25 which carries an annular seal 26. The centre of the head contains a recess which is aligned with the common axis of the bore 15 and the piston 17 and which receives one end of a compression spring 28. The other end of the compression spring bears against an annular seat 30 arranged around the outlet 12.

The outlet chamber 16 has a generally cylindrical section 30 adjacent the bore 15 followed by a converging frusto-conical portion 31 terminating in the seat 30 adjacent the outlet 12. The cone angle of the frusto-conical portion 31 is generally the same as the cone angle of the frusto-conical outer surface 25 on the head 24.

An orifice 32 is provided in the outlet for a purpose to be described below.

In use, the valve is connected to a reservoir containing a liquid under pressure. The reservoir also contains unwanted gas.

When unpressurised, the valve is in a position (shown in FIG. 2) in which the piston 17 is forced by the compression spring 28 in an upstream direction until the projection 20 engages the seal 21, with the head 24 of the piston 17 being spaced from the interior surface of the outlet chamber 16. When initially pressurised, gas from the reservoir 33 lifts the piston 17 against the bias of the spring 28 and passes into the inlet chamber 14 and through the capillary 23 into the outlet chamber 16 from whence it passes to the outlet 12 which is at a pressure lower than the reservoir pressure. The pressure drop across the piston 17 caused by the passage of gas through the capillary 23 is minimal so that the projections 20 remain very close to the seal 19 as a result of the force provided by the compression spring 28. In addition, the pressure drop in the gas flow caused by the presence of the orifice 33 further reduces the pressure drop across the piston 17.

When gas has been bled from the reservoir 33, liquid enters the inlet 11 and the inlet chamber 14 and starts to pass through the capillary 23. Due to its increased viscosity, this produces a substantial pressure drop across the piston 17 sufficient to overcome the biasing force supplied by the compression spring 28. The piston 17 thus moves to the position shown in FIG. 1 in which the frusto-conical surface 25 on the head 24 engages the frusto-conical portion 31 of the outlet chamber 16. This engagement, and the compression of the annular seal 29 between these parts, closes the outlet 12 and so prevents liquid bleeding from the valve.

The liquid does, however, continue to enter the outlet chamber 16. Since the cross-sectional area of the surface 39 of the head 24 is substantially greater than the cross-sectional area of the piston body 18, the pressure of liquid acting on the surface 39 provides an additional force maintaining the piston 17 in the downstream position shown in the drawing.

Thus, fluctuations of pressure in the liquid in the reservoir 33 have little or no effect on the closure of the outlet 12. In this way, intermittent depressurization of the reservoir 33 can be mitigated or avoided.

It will be appreciated, of course, that there are many alterations that can be made in the arrangement decribed above. The compression spring 28 need not be situated as shown, it could be arranged to act between the housing 10 and the piston 17 at another point. The surfaces closing the outlet 12 need not be frusto-conical, they could be some other shape. It will also be appreciated that the ratio of the area of piston body 18 and the head 24 can be arranged such as to accommodate the expected transient pressure reductions. The pressure drop need not be caused by a capillary; it could be produced by any suitable means having an equivalent effect.

It will also be appreciated that the piston body 18 and the piston head 24 need not be formed together. They could be formed separately with the motion of one being transmitted to the other. The area acted on by the liquid need not be in the outlet chamber 16, it could be in the inlet chamber 14.

Although the valve described above with reference to the drawings is for bleeding gas from a liquid, it could be used for bleeding a liquid from a gas reservoir with a reversal of parts. In such a case, as seen in FIG. 3, the piston 17 is arranged to provide a passage 40 which is not a capillary and which contains an orifice 41. The outlet 13 has no orifice, but includes a capillary 42. As liquid passes through the passage 40 there is little pressure drop across the piston 17 but there is a large pressure drop across the capillary 42. When gas passes through the passage 40, the pressure drop is increased by the orifice 41 so that the piston 17 moves against the spring bias to close the valve, with the gas acting on the head 24 to increase the closing force.

I claim:

1. An automatic bleed valve for bleeding to a vent one fluid component from a reservoir containing a liquid component and a gas component, comprising:
   a housing having an inlet connecting to the reservoir and an outlet connecting to the vent,
   an inlet chamber communicating with said inlet,
   an outlet chamber communicating with said outlet,
   a bore connecting said chambers,
   a piston received in said bore, sliding between upstream and downstream positions and having one end in said inlet chamber and one end in said outlet chamber,
   biasing means for biasing the piston towards the upstream position,
   communicating means within said piston for communicating the inlet chamber with the outlet chamber to pass the bled component to the outlet without overcoming the force of the biasing means and producing a force on the piston moving the piston to the downstream position when the other component passes therethrough and preventing communication between the inlet and the outlet.
   a piston surface cooperatively arranged with said piston in a location acted on when the piston is in the downstream position by a portion of the other component which has passed through the communicating means to produce a force urging the piston into the downstream position.

2. A valve according to claim 1 and for bleeding gas from a liquid reservoir wherein the communicating means comprises a capillary which permits the passage of gas therethrough without moving the piston from the upstream position and which produces a force on the piston when the liquid passes therethrough to move the piston to the downstream position.

3. A valve according to claim 2 wherein the outlet includes an orifice which creates a pressure drop in a flow of gas therethrough to reduce the pressure drop across the piston when the gas flows therethrough.

4. An automatic bleed valve for bleeding to a vent one fluid component from a reservoir containing a liquid component and a gas component, comprising:
   a housing having an inlet connecting to the reservoir and an outlet connecting to the vent,
   an inlet chamber communicating with said inlet,
   an outlet chamber communicating with said outlet,
   a bore connecting said chambers,
   a piston received in said bore, sliding between upstream and downstream positions and having one end in said inlet chamber and one end in said outlet chamber and having a generally cylindrical body slidable in said bore, the downstream end of the piston comprising an annular head connected to said body, located within the outlet chamber and having a diameter greater than the diameter of the piston body, the head including a radially extending annular surface extending around said piston body
   biasing means biasing the piston towards the upstream position,
   means within said piston communicating the inlet chamber with the outlet chamber to pass the bled component to the outlet without overcoming the force of the biasing means and producing a force on the piston moving the piston to the downstream position when the other component passes therethrough and preventing communication between the piston means and the outlet, wherein the radially extending annular surface is acted on by the other component when the piston is in the downstream position to produce a force urging the piston into the downstream position.

5. A valve according to claim 4 wherein the outlet is co-axial with the common axis of the piston and the bore, the outlet chamber including a frusto-conical portion adjacent said outlet and the head including a frusto-conical outer surface portion which is spaced downstream of the annular surface and which in the downstream position of the piston engages said frusto-conical portion of the outlet chamber to close the outlet.

6. A valve according to claim 5 wherein a seal is provided on the frusto-conical portion of the head for sealing engagement with said frusto-conical surface of the outlet chamber in the downstream position of the piston.

7. A valve according to claim 4 wherein the outlet is co-axial with the common axis of the piston and the bore, said head including a recess extending co-axially with the common axis of the piston and the bore, a spring being arranged between said recess and the housing to form said biasing means.

8. A valve according to claim 4 wherein the capillary extends between a point on the outer surface of the piston adjacent the upstream end of the piston and a point on the outer surface of the piston which is upstream of said radially extending surface.

9. A valve according to claim 1 and for bleeding liquid from a gas reservoir wherein the communicating means comprises a passage including an orifice which permits the passage of liquid therethrough without moving the piston from the upstream position and which produces a force on the piston when the gas passes therethrough to move the piston to the downstream position.

10. A valve according to claim 9 wherein the outlet includes a capillary which creates a pressure drop in a flow of liquid therethrough to reduce the pressure drop across the piston when liquid flows therethrough.

* * * * *

UNITED STATES PATENT AND TRADEMARK OFFICE
CERTIFICATE OF CORRECTION

PATENT NO. : 5,211,200

DATED : May 18, 1993

INVENTOR(S) : Ronald F. Cassidy

It is certified that error appears in the above-identified patent and that said Letters Patent is hereby corrected as shown below:

ON THE TITLE PAGE:
Item no. 30, Foreign Application Priority Data, change "9111327" to --9111327.4--.

Claim 1, col. 4, line 22, change "." to --,--.

Signed and Sealed this

Eleventh Day of January, 1994

Attest:

BRUCE LEHMAN

Attesting Officer

Commissioner of Patents and Trademarks